United States Patent
Bacchus et al.

(10) Patent No.: US 11,702,107 B2
(45) Date of Patent: Jul. 18, 2023

(54) METHOD AND SYSTEM FOR SATELLITE PERFORMANCE FOR NAVIGATING A MOBILE PLATFORM IN AN ENVIRONMENT USING ONBOARD PERCEPTION

(71) Applicant: GM GLOBAL TECHNOLOGY OPERATIONS LLC, Detroit, MI (US)

(72) Inventors: Brent N. Bacchus, Sterling Heights, MI (US); Rakesh Kumar, Mississauga (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 314 days.

(21) Appl. No.: 17/034,898

(22) Filed: Sep. 28, 2020

(65) Prior Publication Data

US 2022/0097730 A1    Mar. 31, 2022

(51) Int. Cl.
*B60W 60/00*   (2020.01)
*G01S 19/46*   (2010.01)
*G01S 19/48*   (2010.01)
*G01S 19/42*   (2010.01)
*G01C 21/34*   (2006.01)
(Continued)

(52) U.S. Cl.
CPC ........ *B60W 60/0015* (2020.02); *B60W 30/09* (2013.01); *B60W 30/0956* (2013.01); *G01C 21/3461* (2013.01); *G01S 19/42* (2013.01); *G01S 19/425* (2013.01); *G01S 19/46* (2013.01); *G01S 19/485* (2020.05); *B60W 2420/42* (2013.01); *B60W 2420/52* (2013.01); *B60W 2554/20* (2020.02); *B60W 2554/40* (2020.02)

(58) Field of Classification Search
CPC .................. B60W 60/0015; G01S 19/485
See application file for complete search history.

(56) References Cited

U.S. PATENT DOCUMENTS

2019/0285754 A1* 9/2019 van Diggelen ....... G01S 19/428
2021/0160712 A1* 5/2021 Tadayon ............... H04L 1/0003

OTHER PUBLICATIONS

S. Miura, S. Hisaka and S. Kamijo, "GPS multipath detection and rectification using 3D maps," 16th International IEEE Conference on Intelligent Transportation Systems (ITSC 2013), The Hague, 2013, pp. 1528-1534, doi: 10.1109/ITSC.2013.6728447.

(Continued)

*Primary Examiner* — Jess Whittington
(74) *Attorney, Agent, or Firm* — Lorenz & Kopf, LLP

(57) ABSTRACT

Methods and systems are provided for navigating a mobile platform in an environment. A processor obtains information about an object in the environment, obtains information about a first satellite, and estimates a probability indicator for a non-line of sight signal transmission between a current satellite location of the first satellite and a current location of the mobile platform using the information about the first satellite and the information about the object. The processor further determines a discrepancy indicator using a movement information of the mobile platform and a movement information of the first satellite such that a weighting indicator can be determined using the estimated probability indicator and the determined discrepancy indicator. The processor then assigns a weighting indicator to a satellite signal transmitted from the first satellite in order to provide a first weighted signal for navigating the mobile platform.

18 Claims, 5 Drawing Sheets

(51) Int. Cl.
B60W 30/095 (2012.01)
B60W 30/09 (2012.01)

(56) References Cited

OTHER PUBLICATIONS

M. Obst, S. Bauer, P. Reisdorf and G. Wanielik, "Multipath detection with 3D digital maps for robust multi-constellation GNSS/INS vehicle localization in urban areas," 2012 IEEE Intelligent Vehicles Symposium, Alcala de Henares, 2012, pp. 184-190, doi: 10.1109/IVS.2012.6232285.

Y. Gu, L. Hsu and S. Kamijo, "GNSS/Onboard Inertial Sensor Integration With the Aid of 3-D Building Map for Lane-Level Vehicle Self-Localization in Urban Canyon," in IEEE Transactions on Vehicular Technology, vol. 65, No. 6, pp. 1274-4287, Jun. 2016, doi: 10.1109/TVT.2015.2497001.

Zair S, Le Hégarat-Mascle S, Seignez E. Outlier Detection in GNSS Pseudo-Range/Doppler Measurements for Robust Localization. Sensors (Basel). 2016;16(4):580. Published Apr. 22, 2016. doi:10.3390/s16040580.

Groves, PD; Jiang, Z; Rudi, M; Strode, P; (2013) A Portfolio Approach to NLOS and Multipath Mitigation in Dense Urban Areas. In: Proceedings of the 26th International Technical Meeting of The Satellite Division of the Institute of Navigation (ION GNSS 2013). (pp. 3231-3247). The Institute of Navigation: Manassas, US. Https://www.ion.org/gnss/abstracts.cfm?paperID=7618.

Naveen S. Gowdayyanadoddi, James T. Curran, Ali Broumandan, Gérard Lachapelle, "A Ray-Tracing Technique to Characterize GPS Multipath in the Frequency Domain", International Journal of Navigation and Observation, vol. 2015, Article ID 983124, 16 pages, 2015. https://doi.org/10.1155/2015/983124.

* cited by examiner

METHOD AND SYSTEM FOR SATELLITE PERFORMANCE FOR NAVIGATING A MOBILE PLATFORM IN AN ENVIRONMENT USING ONBOARD PERCEPTION

INTRODUCTION

The technical field generally relates to satellite navigation of moving platforms, for example vehicles, within an environment. More particularly it relates to a method and a system for navigating a mobile platform in an environment to improve the localization of the mobile platform, especially in multipath environments.

In the last years, satellite navigation systems have achieved great importance due to an increasing demand for passenger transportation systems. Such satellite navigation systems provide positioning information for vehicles moving through an environment on the earth's surface. In particular, the positioning information is used to navigate the vehicles or to provide information about a traffic situation in certain regions. Satellite navigation and the positioning information is dependent on the signal quality between the satellites of the satellite navigation system and the ground vehicle. The requirement for accurate positioning information is important for navigation purposes and becomes even more important for navigation scenarios in which the vehicle navigates through densely populated areas, for example large cities. In a city, especially in regions having tall buildings, the signal quality can be deteriorated due to blockage and reflections of the transmitted signals from the satellites. This can lead to inaccuracies in the positioning information.

Accordingly, it is desirable to take into account objects in the environment of a vehicle that can deteriorate a signal transmission between a satellite and a mobile platform during navigation of the mobile platform through the environment. In addition, it is desirable to use the information of such a deteriorated signal transmission in order to improve the positioning information to be provided to the mobile platform. Furthermore, other desirable features and characteristics of the present invention will become apparent from the subsequent detailed description and the appended claims, taken in conjunction with the accompanying drawings and the foregoing technical field and background.

SUMMARY

A computer implemented method for navigating a mobile platform, for example a vehicle, in an environment is provided. The method includes obtaining, by a processor, information about an object in the environment based on received data from the environment. The method further includes obtaining, by the processor, information about a first satellite, for example via a receiver onboard the vehicle. The method further includes estimating, by the processor, a probability indicator for a non-line of sight signal transmission between a current satellite location of the first satellite and a current location of the mobile platform, wherein the probability indicator is estimated using the information about the first satellite and the information about the object. The method further includes determining, by the processor, a discrepancy indicator using a movement information of the mobile platform and a movement information of the first satellite, wherein discrepancy indicator is representative for an inaccuracy in signal transmission between the first satellite and the mobile platform. The method further includes determining, by the processor, a weighting indicator using the estimated probability indicator and the determined discrepancy indicator. The method further includes assigning, by the processor, the determined weighting indicator to a satellite signal transmitted from the first satellite in order to provide a first weighted signal for navigating the mobile platform.

In an exemplary embodiment, the object in the environment is a dynamic object moving within the environment or a static object fixed with respect to the environment.

In an exemplary embodiment, obtaining the received data from the environment is based on image data from an onboard camera of the mobile platform.

In an exemplary embodiment, the probability indicator is estimated using the image data of the environment, wherein the image data includes the information about the object in the environment.

In an exemplary embodiment, the processor obtains the information about the object in the environment further based on stored map data representative of the environment.

In an exemplary embodiment, obtaining information about the first satellite includes processing information about a determined location of the first satellite. The processor determines a plurality of sample locations of the mobile platform in the environment. The probability indicator is estimated using the determined location of the first satellite and the plurality of sample locations of the mobile platform.

In an exemplary embodiment, estimating the probability indicator includes obtaining, by a camera, an image of the environment of the mobile platform, wherein the image includes the object. The processor determines a plurality of sample locations of the first satellite using the sample locations of the mobile platform in the environment and a camera characteristic, e.g., a camera metric, of the mobile platform. The processor projects the plurality of sample locations of the first satellite into the image and estimates the probability indicator based on a relative position of the plurality of sample locations of the first satellite with respect to the object within the image. For example, the process described in this embodiment may be done for all the satellites from which the receiver receives a signal.

In an exemplary embodiment, the processor identifies a first region within the image that represents the object and a second region within the image that represents a sky. The processor estimates the probability indicator by determining a subset of sample locations of the first satellite that overlap with the second region within the image.

In an exemplary embodiment, the probability indicator is estimated by providing a ratio between the subset of sample locations of the first satellite that overlap with the second region and the plurality of sample locations of the first satellite.

In an exemplary embodiment, the probability indicator is estimated further using a lidar information and/or a radar information.

In an exemplary embodiment, the non-line of sight signal transmission between the current satellite location of the first satellite and the current location of the mobile platform occurs as a result of a blockage of a direct signal transmission between the first satellite and the mobile platform.

In an exemplary embodiment, the processor uses the weighted satellite signal for determining the current location of the mobile platform.

In an exemplary embodiment, the processor combines the weighted satellite signal with a further satellite signal from a global navigation satellite system for determining the current location of the mobile platform.

In an exemplary embodiment the probability indicator is estimated as a probability value and the weighting indicator is determined as a weighting factor. The processor determines the weighting factor as a function of the probability value.

In an exemplary embodiment, the processor determines the discrepancy indicator based on a measurement of a Doppler shift (e.g., pseudo range rate) between the first satellite and the mobile platform.

In an exemplary embodiment, the processor determines the discrepancy indicator based on a measurement of a pseudo-range between the first satellite and the mobile platform.

In an exemplary embodiment, the mobile platform is a ground vehicle, a water vehicle, an aircraft, or a portable mobile device such as a mobile phone or tablet.

In an exemplary embodiment, the processor obtains information about a second satellite and estimates a second probability indicator for a non-line of sight signal transmission between a current satellite location of the second satellite and a current location of the mobile platform, wherein the second probability indicator is estimated using the information about the second satellite and the information about the object. The processor determines a second discrepancy indicator using a movement information of the mobile platform and a movement information of the second satellite, wherein second discrepancy indicator is representative for an inaccuracy in signal transmission between the second satellite and the mobile platform. The processor determines a second weighting indicator using the estimated second probability indicator and the determined second discrepancy indicator. The processor assigns the determined second weighting indicator to a satellite signal transmitted from the second satellite in order to provide a second weighted signal for navigating the mobile platform.

A vehicle is provided. The vehicle includes a sensor configured to generate camera data and a processor configured to obtain information about an object in the environment based on received camera data from the environment. The processor is further configured to obtain information about a first satellite and to estimate a probability indicator for a non-line of sight signal transmission between a current satellite location of the first satellite and a current location of the vehicle, wherein the probability indicator is estimated using the information about the first satellite and the information about the object. The processor is further configured to determine a discrepancy indicator using a movement information of the vehicle and a movement information of the first satellite, wherein discrepancy indicator is representative for an inaccuracy in signal transmission between the first satellite and the vehicle. The processor is further configured to determine a weighting indicator using the estimated probability indicator and the determined discrepancy indicator. The processor is further configured to assign the determined weighting indicator to a satellite signal transmitted from the first satellite in order to provide a weighted signal for navigating the vehicle.

A system for navigating a vehicle in an environment is provided. The system includes a first satellite and a vehicle. The vehicle includes a processor configured to obtain information about an object in the environment based on received data from the environment. The processor is further configured to obtain information about the first satellite and to estimate a probability indicator for a non-line of sight signal transmission between a current satellite location of the first satellite and a current location of the vehicle, wherein the probability indicator is estimated using the information about the first satellite and the information about the object. The processor is further configured to determine a discrepancy indicator using a movement information of the vehicle and a movement information of the first satellite, wherein discrepancy indicator is representative for an inaccuracy in signal transmission between the first satellite and the vehicle. The processor is further configured to determine a weighting indicator using the estimated probability indicator and the determined discrepancy indicator. The processor is further configured to assign the determined weighting indicator to a satellite signal transmitted from the first satellite in order to provide a weighted signal for navigating the vehicle.

In an exemplary embodiment, the system further comprises a plurality of satellites. The processor is configured to obtain information about the plurality of satellites. The processor is further configured to estimate probability indicators, wherein each probability indicator is indicative of a non-line of sight signal transmission between a current satellite location of a respective one of the plurality of satellites and a current location of the vehicle, wherein the probability indicator is estimated using the information about the plurality of satellites and the information about the object. The processor is further configured to determine weighting indicators using the estimated probability indicators and to assign each determined weighting indicator to a respective satellite signal transmitted from a respective one of the plurality of satellites in order to provide multiple weighted signals for navigating the vehicle.

BRIEF DESCRIPTION OF THE DRAWINGS

The exemplary embodiments will hereinafter be described in conjunction with the following figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module and/or system refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein are merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
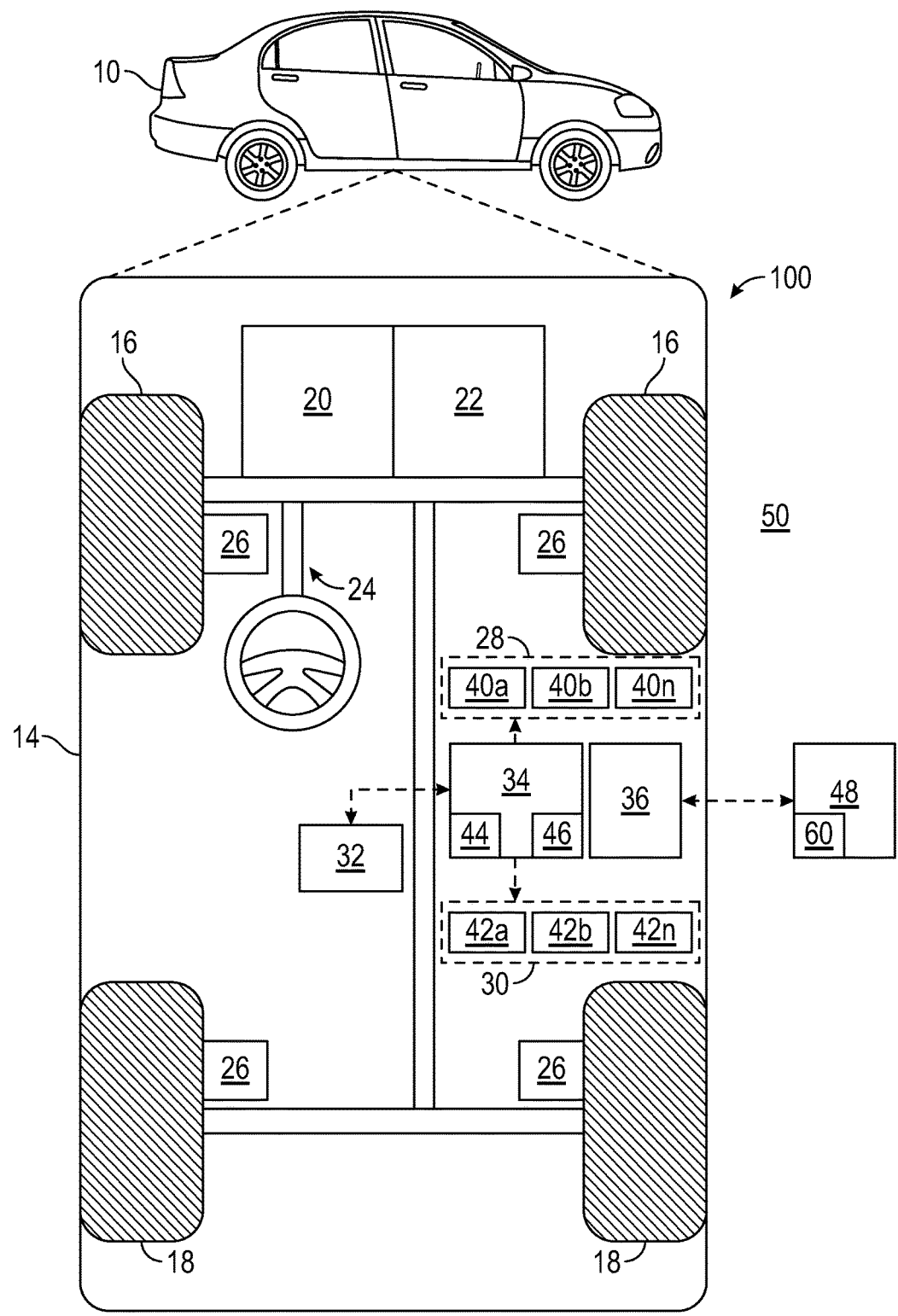
FIG. 1 is a vehicle having a processor executing a method for navigating the vehicle in an environment in accordance with an embodiment.

With reference to FIG. 1, a vehicle 10 is shown in accordance with various embodiments. The vehicle 10 generally includes a body 14, front wheels 16, and rear wheels 18. The vehicle 10 generally includes a propulsion system 20, a transmission system 22, a steering system 24, a brake system 26, a sensor system 28, an actuator system 30, at least one data storage device 32, at least one controller 34, an input unit 35 and a communication system 36. The propulsion system 20 may, in various embodiments, include an internal combustion engine, an electric machine such as a traction motor, and/or a fuel cell propulsion system.

The sensor system 28 includes one or more sensing devices 40a-40n that sense observable conditions of the exterior environment 50 and/or the interior environment of the vehicle 10 which for instance is an autonomous vehicle 10. One or more of the sensing devices 40a-40n may, for example, sense objects in the exterior environment 50 of the vehicle 10. The sensing devices 40a-40n can include, but are not limited to, radars, lidars, global positioning systems, optical cameras, thermal cameras, ultrasonic sensors, temperature sensors and/or other sensors. For example, a sensing device 40a can include a camera configured for receiving image data from the environment 50, i.e., the surroundings of the vehicle 10. The image data can include information about at least one object 50a-50c (FIG. 2) located in the environment 50 of the vehicle 10. The actuator system 30 includes one or more actuator devices 42a-42n that control one or more vehicle features such as, but not limited to, the sensing device 40a-40n, the propulsion system 20, the transmission system 22, the steering system 24, and the brake system 26.

The communication system 36 is configured to wirelessly communicate information to and from other entities 48, such as but not limited to a satellite navigation system 60 (FIG. 2), other vehicles ("V2V" communication,) infrastructure ("V2I" communication), remote systems, and/or personal devices.

In an exemplary embodiment, the communication system 36 is configured to receive satellite signals from the satellite navigation system 60.

In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

In various embodiments, the data storage device 32 stores defined maps of the navigable environment 50. In particular, the data storage device 32 may provide map data being representative of an environment 50 of the vehicle 10. The map data may be updated continuously, i.e., in real-time, to provide map data corresponding to an environment 50 the vehicle 10 is currently driving through. In various embodiments, the defined maps may be predefined by and obtained from a remote entity 48 such as a remote data server. For example, the defined maps may be assembled by the remote system and communicated to the autonomous vehicle 10 (wirelessly and/or in a wired manner) and stored in the data storage device 32. The data storage device 32 may have stored image data of an environment 50. For example, the stored image data may include appearances of objects allocated to specified locations in the environment 50. As can be appreciated, the data storage device 32 may be part of the controller 34, separate from the controller 34, or part of a system separate from the vehicle 10.

The controller 34 includes at least one processor 44 and a computer readable storage device or media 46 on which map data, i.e., image data, can be stored. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10, in particular for navigating the vehicle 10 within the environment.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for navigating the vehicle 10 within the environment 50, for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, the controller 34 and/or the processor 44 implements machine learning techniques to assist the functionality of the controller 34 and/or the processor 44, such as feature detection/classification, obstruction mitigation, route traversal, mapping, sensor integration, ground-truth determination, and the like.

In various embodiments, the controller 34 implements methods and systems for navigating around an environment as will be discussed in more detail herein.

Figure 2:
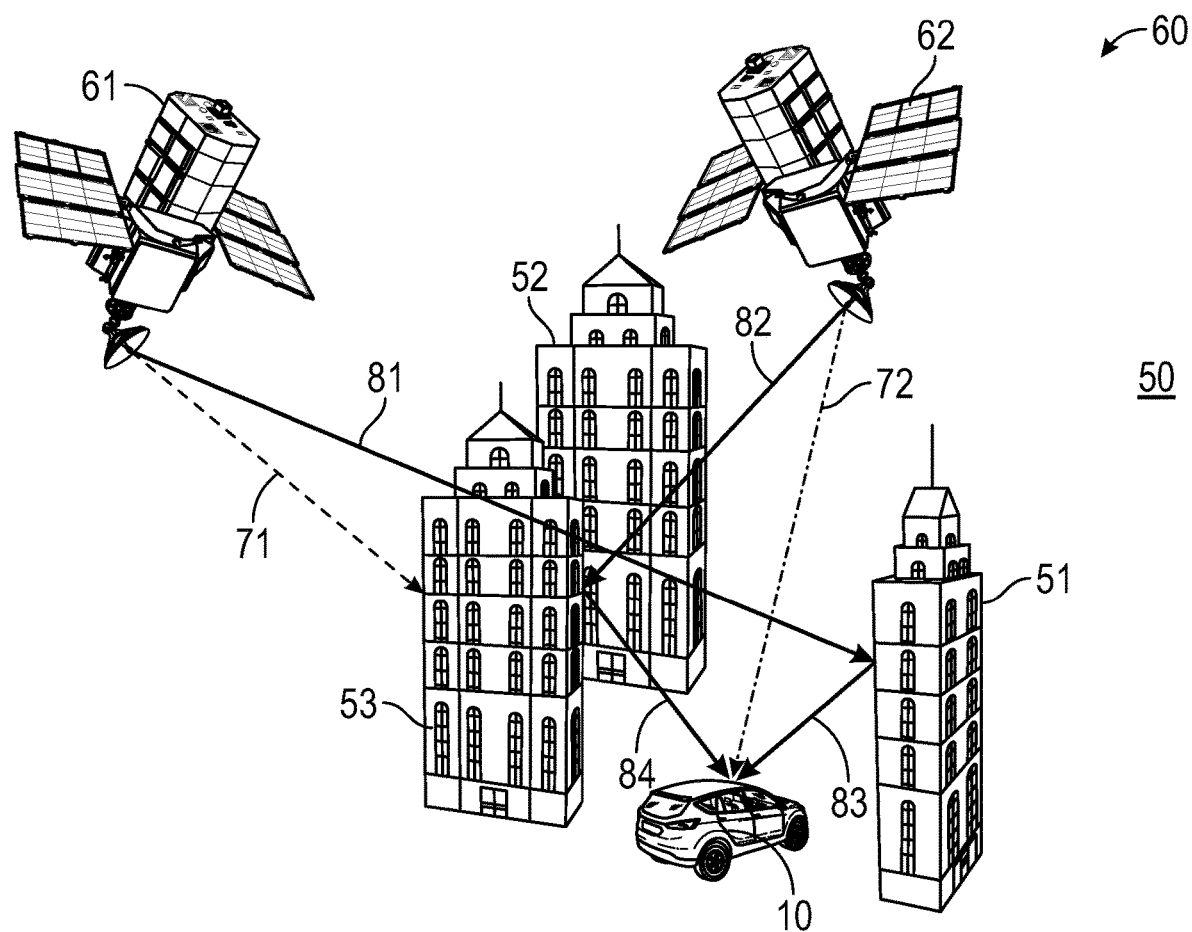
FIG. 2 is an illustration showing a system for navigating a vehicle in an environment in accordance with an embodiment.

With reference now to FIG. 2, an illustration showing a system 60 for navigating the vehicle 10 in an environment 50 is shown. The environment 50 includes at least one object 51-53. The objects 51-53 in FIG. 2 are buildings surrounding a street (not shown) on which the vehicle 10 is located. The system 60 includes a first satellite 61 transmitting a first satellite signal 71 in the direction of the environment 50. As can be seen from FIG. 2, the first satellite signal 71 between the first satellite 61 and the vehicle 10 is blocked by object 53. However, the vehicle still receives a reflection 83 after bouncing from another object 51. Such a reflection is referred to as a non-line of sight (NLOS) signal transmission between a satellite and vehicle 10. Also shown is a multipath signal 84 and 72 between a second satellite 62 and vehicle 10 which occurs due to reflections at object 53. The satellite signal 71 transmitted by satellite 61 is blocked and never reaches the vehicle 10. The same satellite's signal is received as multipath signal 83 by the vehicle/receiver after bouncing from object 51. As can be seen from FIG. 2, the second satellite signal 72 of the second satellite 62 can be transmitted to vehicle 10 on a direct path. Such a direct signal transmission is referred to as a line of sight (LOS) signal transmission between a satellite and vehicle 10. In an example, the vehicle 10 may determine its location without using the multipath signals 81, 83, 82, 84. The vehicle 10 may then rely only on the NLOS signal transmissions and/or the LOS signal transmissions between the vehicle 10 and a respective satellite.

In an exemplary embodiment, the processor 44 of the vehicle 10 obtains information about at least one object 51-53 in the environment 50 based on received data from the environment 50. The vehicle 10 may use the sensor system 28, in particular the sensing devices 40a-40n (FIG. 1) in order to perceive or receive the information about at least one object 51-53 in the environment 50. In an example, one or more cameras receive the data as image data from images of the environment 50. The image data of the environment 50 may include an appearance of the at least one object 51-53, in particular outlines or contours of the at least one object 51-53.

The processor 44 is configured to process the images or image data by applying a segmentation process to distinguish a first region defining the at least one object 51-53 and a second region defining an open sky as will be described in more detail below. Using this segmentation, the processor 44 of the vehicle 10 can detect static objects 51-53, e.g., buildings, and dynamic objects, e.g., other vehicles or buses, possibly occluding the satellites 61, 62 as seen from the vehicle 10. In other words, onboard perception is used to determine whether or not a blockage of direct signal transmission 71, 72 between the vehicle 10 and the satellites 61, 62 might probably occur. Optionally, prior models in a map, in particular map data, of the environment 50, can be used in addition to the perceived data of the environment 50. The result of the determination is used to evaluate the probability of a NLOS signal transmission between the satellite 61 and the vehicle 10 and/or between the satellite 62 and the vehicle 10 and/or between further satellites (not shown) and the vehicle 10. In addition, the processor 44 computes a discrepancy based on GPS (Global Positioning System) signal doppler and the host kinematics. Based on the evaluated probability and the computed discrepancy, a weighting for each satellite transmission signal can be determined and assigned thereto. In this manner, the processor 44 can take into account inaccuracies due NLOS signal transmissions and use the information to reduce the impact of probably occluded satellites 61, 62. This approach will be described in detail in the following.

Figure 3:
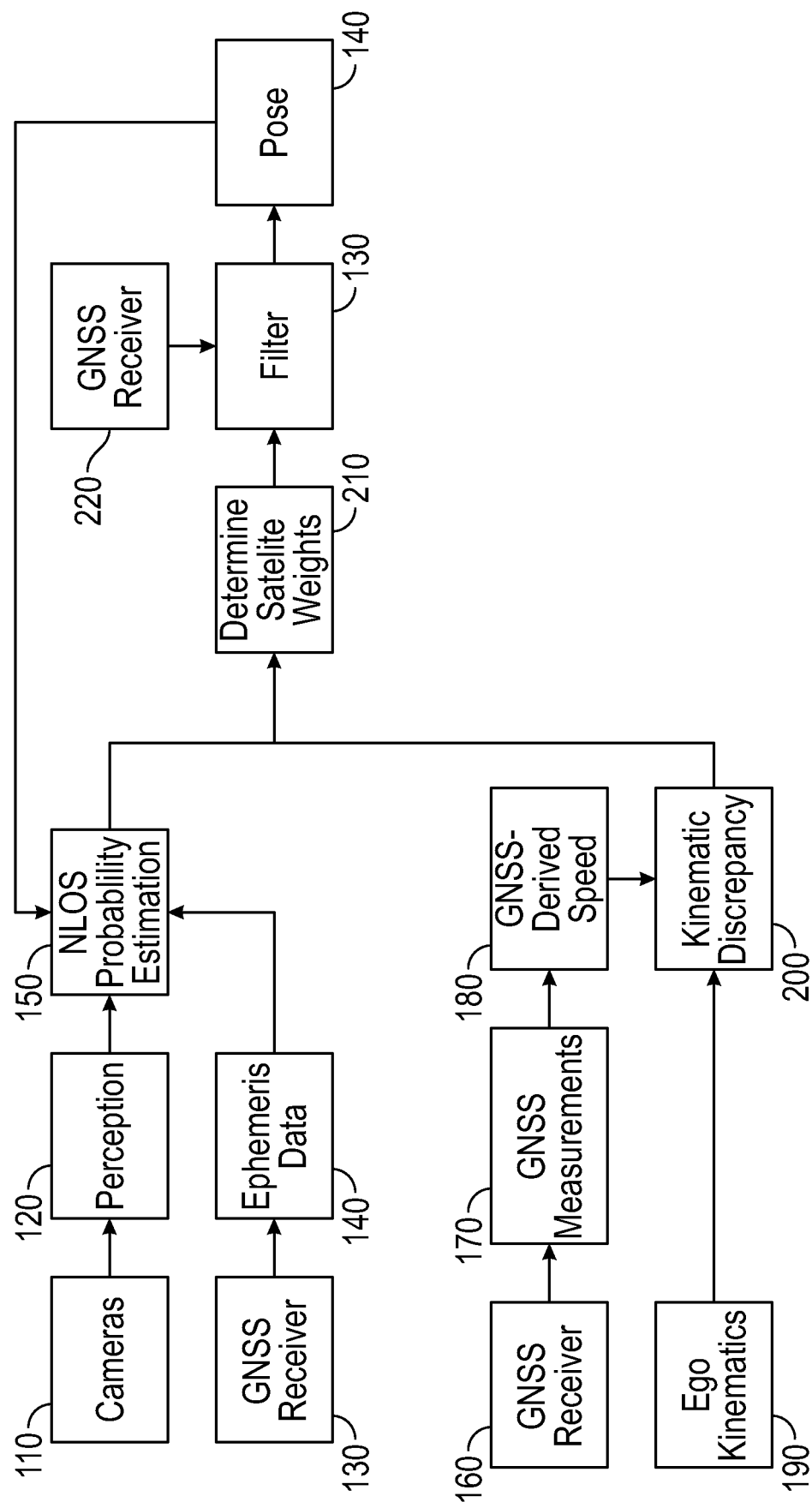
FIG. 3 is a block diagram of a method for navigating a mobile platform in an environment in accordance with an embodiment.

FIG. 3 is a block diagram of a computer implemented method for navigating a mobile platform, e.g., a vehicle, in an environment. In various embodiments, the described computer implemented method may be executed by the processor 44 of the vehicle 10 shown in FIGS. 1 and 2. In various embodiments, the computer implemented method supports the vehicle 10 in navigating through an environment 50 as shown in FIG. 2.

In one example, a camera receives one or more images from the environment in step 110. The camera may be an onboard camera that is part of the sensor system 28 of the vehicle 10. The one or more images include image information such as a depiction of a part of the environment as seen from the camera. In step 120, the processor 44 obtains information about at least one object in the environment based on received data from the environment by detecting the at least one object within the one or more images. The information about the at least one object may include data about a location and/or an appearance of the of the at least one object. The at least one object may be a dynamic object, such as a vehicle or person moving within the environment, or a static object, such as a building or tree fixed with respect to the environment.

In step 130, a satellite navigation system, for example a Global Satellite Navigation System (GNSS), provides information about a first satellite to a receiving system of the vehicle that includes, for example, the above-described communication system or sensing system of vehicle. Herein, the receiving system of the vehicle will be also referred to as GNSS receiver. The first satellite may be a satellite of the satellite navigation system. The information about the first satellite is obtained by the processor 44 in step 140. In particular, Ephemeris data of the first satellite is provided to the processor 44. Ephemeris data may include information about a location, a trajectory and/or a movement of the first satellite.

In Step 150, the processor estimates a probability indicator for a non-line of sight signal transmission between a current satellite location of the first satellite and a current location of the vehicle, wherein the probability indicator is estimated using the information about the first satellite and the information about the at least one object. The probability indicator estimated in step 150 is representative for a probability with which the signal transmission between the current location of the first satellite and the current location of the vehicle is blocked by the at least one object, for example a tall building in the environment of the vehicle. The estimation of the probability indicator will be described in more detail with reference to FIG. 4.

The first satellite or the satellite navigation system provides in step 160 movement information about the first satellite to the receiving system of the vehicle, i.e., the GNSS receiver, wherein measurements regarding the movement information are made in step 170. The provision of the measurements regarding the movement information to the vehicle may be carried out continuously. In step 180, a speed of the first satellite may be determined and provided as part of the movement information of the first satellite. In addition, movement information about the vehicle is provided in step 190. The movement information about the vehicle may be determined from kinematic characteristics (so-called ego kinematics) of the vehicle, wherein the kinematic characteristics of the vehicle may be obtained by the sensing system of the vehicle. The processor then determines in step 200 a discrepancy indicator using the movement information of the vehicle and the movement information of the first satellite. The discrepancy indicator is representative for an inaccuracy in signal transmission between the first satellite and the vehicle which is due to their relative movement. Since the discrepancy indicator is determined based on kinematic characteristics with respect to the vehicle and/or with respect to the first satellite, the discrepancy indicator may also be referred to as kinematic discrepancy. The determination of the discrepancy indicator will be described in more detail with reference to FIG. 5.

In step 210, the processor determines a weighting indicator using the estimated probability indicator and the determined discrepancy indicator. In step 220, the processor further assigns the determined weighting indicator to a satellite signal that is transmitted in step 220 from the first satellite to the GNSS receiver of the vehicle in order to provide a first weighted signal for navigating the vehicle.

In an exemplary embodiment, the processor can use the weighted satellite signal for determining the current location of the mobile platform. The processor may particularly combine the weighted satellite signal of the first satellite with a further satellite signal from another satellite of the global navigation satellite system for determining the current location of the mobile platform.

Although the method of FIG. 3 is described with reference to only the first satellite, it is understood that the method may also be applied using a plurality of satellites of a satellite navigation system such that a plurality of weighting indicators can be determined, wherein each weighting indicator is assigned to a transmission signal of a respective satellite of the plurality of satellites.

For example, the processor obtains information about a second satellite and estimates a second probability indicator for a non-line of sight signal transmission between a current satellite location of the second satellite and a current location of the vehicle, wherein the second probability indicator is estimated using the information about the second satellite and the information about the at least one object already obtained in step 120. The processor then determines a second discrepancy indicator using a movement information of the mobile platform and a movement information of the second satellite, wherein the second discrepancy indicator is representative for an inaccuracy in signal transmission between the second satellite and the mobile platform. The processor then determines a second weighting indicator using the estimated second probability indicator and the determined second discrepancy indicator. The processor then assigns the determined second weighting indicator to a satellite signal transmitted from the second satellite in order to provide a second weighted signal for navigating the mobile platform. In particular, the processor uses the first weighted signal and the second weighted signal to determine the location based on the weighted satellite signals received from the respective satellites.

Step 130 therefore represents a filtering of each of the transmitted satellite signals according to their weighting. The weighted satellite transmission signals are then used in step 140 to determine the position and/or pose of the vehicle for navigation purposes. The higher the weighting of a weighted satellite signal, the higher its influence on determining the position and/or pose of the vehicle. The lower the weighting of a weighted satellite signal, the lower its influence on determining the position and/or pose of the vehicle.

In an exemplary embodiment, the position and/or pose of the vehicle determined in step 140 is provided to the estimation of the probability indicator carried out in step 150. As such, an iterative process can be provided improving the estimation of the probability indicator, i.e., the estimation of the probability of a non-line of sight signal transmission.

In an exemplary embodiment, the probability indicator and the discrepancy indicator may include values.

In an exemplary embodiment, the weighting factor is determined based on a function of the probability value. For example, the two factors NLOS probability and kinematic discrepancy are combined to determine the weightings. A machine learning algorithm, e.g., logistic regression, can be used to determine the weightings online or offline. The following equation is an example equation for determining the weighting:

$$w(x_1, x_2) = \frac{1}{1 + e^{-(\beta_0 + \beta_1 x_1 + \beta_2 x_2)}}$$

wherein:
w represents the weight for a given satellite;
$x_1$ represents the NLOS probability;
$x_1$ represents the kinematic discrepancy;
$\beta_0$, $\beta_1$, $\beta_2$ represent coefficients learned via a training process.

In an exemplary embodiment, thresholds can be established, or the determined probability values and discrepancy value are expressed as quantities. For example, an occlusion by the object greater than 0.7 would give a high probability indicator. In another example, 0.1 would give a low weighting to be assigned to the satellite signal. The following table represents different example combinations of quantities for the probability indicator and for the discrepancy indicator resulting in specified weightings to be assigned to the respective satellite signal, where "low" may indicate values from 0 (including) to 0.33 (excluding), "medium" may indicate values from 0.33 (including) to 0.66 (excluding) and "high" may indicate values from 0.66 (including) to 1.0 (including):

TABLE 1

| Kinematic discrepancy | NLOS | Weighting |
|---|---|---|
| high | high | low |
| high | low | medium |

TABLE 1-continued

| Kinematic discrepancy | NLOS | Weighting |
|---|---|---|
| high | low | low |
| low | low | high |
| low | high | medium |
| high | low | low |

In an exemplary embodiment, the method described above provides an algorithm for improving the performance of a GNSS receiver operating in multipath environments with non-line of sight sources using a perception system, i.e., a camera system, capable of perceiving buildings and other objects in the environment of the vehicle.

In an exemplary embodiment, the method adjusts the weighting assigned to each satellite based on the probability of a non-line of sight signal occurrence between the vehicle and the satellite. In this way, a lower weighting can be assigned to a satellite signal that probably occurs as a non-line of sight signal and a higher weighting can be assigned to a satellite signal that probably occurs as a line of sight signal. This corrects the positioning data from the satellite navigation system in order to more accurately determine the position of a vehicle in a multipath environment, for example an urban canyon. In particular, the GPS performance in urban environments is compromised due to non-line of sight signal reflections and multipath signals as well as due to scenarios in which less than four satellites of a satellite navigation system are available.

The method enables a detection of an NLOS source online without using offline local maps or 3D models of the environment. It will be appreciated, however, that local maps or 3D models of the environment can be used in addition to the above described process. In particular, obtaining the received data from the environment may be based on the image data from the camera of the vehicle and further based on stored map data representative of the environment, the stored map data including the local maps or 3D models.

In an exemplary embodiment, the method avoids using ray tracing and multipath signals between the satellite and the vehicle by only using NLOS signals which reduces computational effort.

Figure 4:
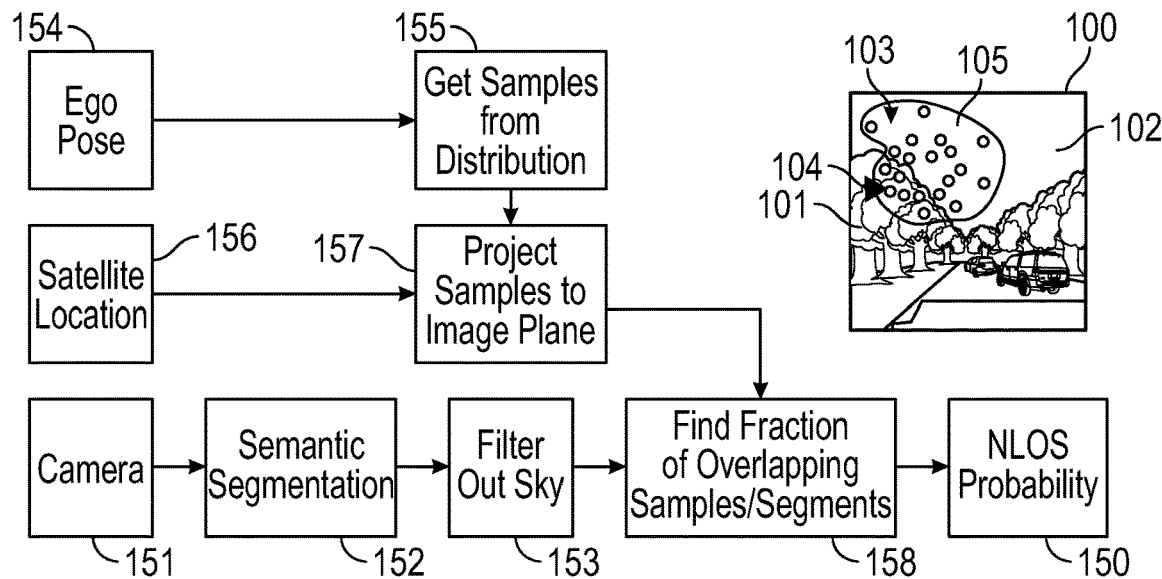
FIG. 4 is a block diagram showing details of the estimation of the probability indicator of the method of FIG. 3 in accordance with an embodiment.

FIG. 4 is a block diagram showing details of the estimation of the probability indicator of step 150 of the method of FIG. 3. In particular, the probability indicator is estimated using the image data of the environment. In various embodiment, the described computer implemented method may be executed by the processor 44 of the vehicle 10 shown in FIGS. 1 and 2.

In one example, a camera generates images of the environment in which the vehicle is located in step 151. The image generation is executed by the camera in real-time when the vehicle moves through the environment. The image includes a depiction of the at least one object. In step 152, a semantic segmentation of the image is executed to obtain different segments, i.e., regions, within the image. An example of this segmentation is described with respect to the image 100 shown in FIG. 4. It is possible that the camera images are applied to a neural network to perform the segmentation, wherein an open sky in a specified region within the images is identified. In step 153, the sky is filtered out in the image 100. Measurements from a lidar, a radar or other sensors of the vehicle may be combined for the segmentation process to improve depth accuracy when processing the images. A first region 101 within the image 100 defines the at least one object as seen from the camera of the vehicle and a second region 102 within the image 100 defines a sky as seen from the camera of the vehicle. The first region 101 within the image 100 may include several objects, for example, trees, other vehicles, buildings, etc. It is noted that the at least one object may be a static object like a building or a moving object like other vehicles or buses nearby. The result of executing the segmentation within the image 100 is a segmented image as shown in FIG. 4.

Additionally, information about a location, i.e., an ego pose, of the vehicle is determined in step 154. There is an uncertainty in this location determination of the vehicle so that multiple samples of possible vehicle locations are determined. In particular, in step 155 random samples are generated for the vehicle location to obtain a sample distribution for possible locations of the vehicle in the environment. In addition, in step 156 a location of the first satellite is determined. Based on the determined sample distribution for possible locations of the vehicle and the determined location of the first satellite, samples of possible satellite locations are determined. In other words, a conversion of the sample distribution of the possible vehicle locations to samples of possible satellite locations is carried out. Camera metrices may be considered and combined with the sample locations of the vehicle to determine the sample locations of the first satellite.

In step 157, the samples of possible satellite locations 103 are projected into the image 100. Furthermore, the first region 101 within the image 100 that represents the at least one object and a second region 102 within the image 100 that represents the open sky are identified. A first plurality of the samples 104 of possible satellite locations overlap with the first region 101 that is defined by the at least one object. Accordingly, a second plurality of the samples 105 of possible satellite locations overlap with the second region 102 that is defined by the open sky.

In step 158, the second plurality of the samples 105 of possible satellite locations overlapping with the second region 102 that is defined by the open sky are identified. Some or all of steps 155, 157 and 158 may use a Monte Carlo approach when being executed by the processor. In step 150, the probability indicator is estimated by determining a subset of sample locations 105 of the first satellite that overlap with the second region 102 within the image 100. In other words, the probability indicator is estimated based on at last the second plurality of the samples 105. For example, the probability indicator is estimated by calculating a ratio between the number of the samples 105 of possible satellite locations overlapping with the second region 102 and the total number of samples 103 of possible satellite locations. In other words, the probability indicator can be estimated by providing a ratio of a number of samples identified within the second region 102 with respect to a number of samples identified within both the first region 101 and the second region 102. The estimated probability indicator provides a probability with which there is a non-line of sight signal transmission between a current satellite location of the first satellite and a current location of the mobile platform that might occur as a result of a blockage of a direct signal transmission between the first satellite and the mobile platform due to the presence of the at least one object in the environment.

Figure 5:
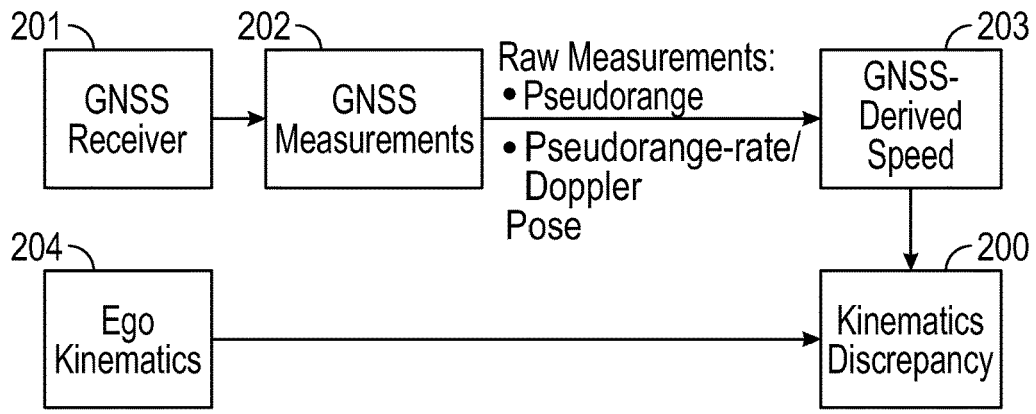
FIG. 5 is a block diagram showing details of the determination of the discrepancy indicator of the method of FIG. 3 in accordance with an embodiment.

FIG. 5 is a block diagram showing details of the determination of the discrepancy indicator of step of 200 of the method of FIG. 3. In various embodiments, the described computer implemented method may be executed by the processor 44 of the vehicle 10 shown in FIGS. 1 and 2.

In step 201, movement information of the first satellite is provided to the receiving system, i.e., to the GNSS receiver, of the vehicle. In step 202, measurements regarding the movement of the first satellite are made. The measurements can be continuously made by the first satellite itself and continuously provided to the vehicle. For example, in step 203 the trajectory and the speed of the first satellite is determined. In addition, kinematic characteristics of the vehicle are provided in step 204. The kinematic characteristics may include the location, the speed and/or the trajectory on which the vehicle moves through the environment. Based on the measurements regarding the movement of the first satellite and the kinematic characteristics of the vehicle, the discrepancy indicator can be determined in step 200. In particular, the measurements based on which the discrepancy indicator is determined may include measuring a pseudo-range defining the distance between a first satellite and/or a pseudo-range rate and/or a Doppler shift between the first satellite and the vehicle. The discrepancy indicator may represent an inaccuracy in the position information caused by the relative movement of the first satellite and the vehicle. As such, the discrepancy indicator may indicate to some extend the reliability of the signal transmission between the first satellite and the vehicle in terms of accuracy.

Figure 6:
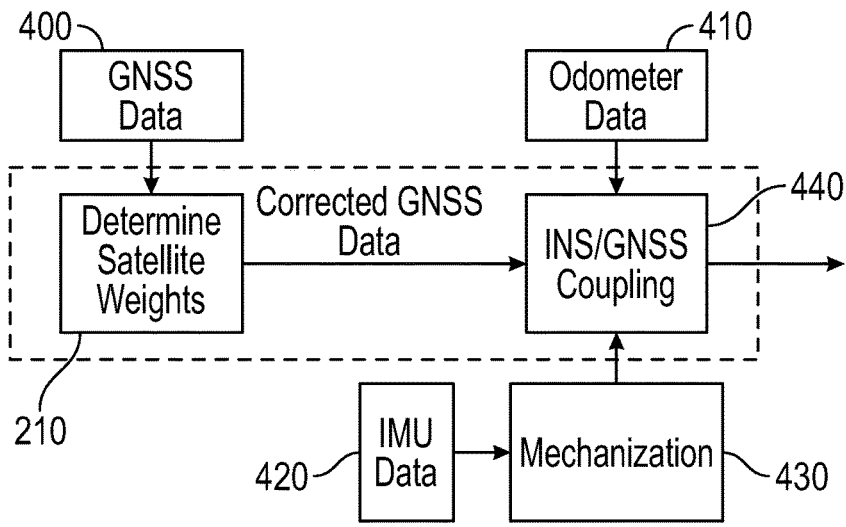
FIG. 6 is a block diagram showing an integration of the method of FIG. 3 into a satellite navigation process in accordance with an embodiment.

FIG. 6 is a block diagram showing an integration of the method of FIG. 3 into a satellite navigation system. In step 400 GNSS data, i.e., positioning data from the satellite navigation system is provided to the processor of the vehicle. The GNSS data is then used to determine the weighting indicator in step 210 as described with respect to FIGS. 3, 4 and 5. In this manner, a weighting indicator can be assigned to each satellite signal received from the satellites of the satellite navigation system. Assigning these weighting indicators to the satellite signals leads to a correction of the positioning data obtained for the vehicle since those signals probably providing a non-line of sight signal transmission between the respective satellite and the vehicle are assigned a lower weighting than those signals probably providing a line of sight signal transmission between the respective satellite and the vehicle. The weighting indicator may represent a factor used to correct the influence of a received signal for each satellite of the satellite navigation system. The result is corrected GNSS data used as positioning information based on which the current position of the vehicle can be determined for navigation purposes.

In Step 410, odometer data is obtained by the vehicle and provided to the processor which combines the odometer data with the corrected GNSS data in step 440. Furthermore, an inertial measurement unit of the vehicle may provide IMU (inertial measurement unit) data in step 420. IMU data can include acceleration data and/or rotational movement information of the vehicle. In step 430, the IMU data is converted into mechanical data of the vehicle that is combined with the odometer data and the corrected GNSS data in step 440. In this manner, the accuracy in determining the position of the vehicle can be improved providing a higher accuracy in open sky scenarios and also urban scenarios in which signal transmission between the vehicle and a satellite of a satellite navigation system is possibly blocked by objects in the environment of the vehicle.

Figure 7:
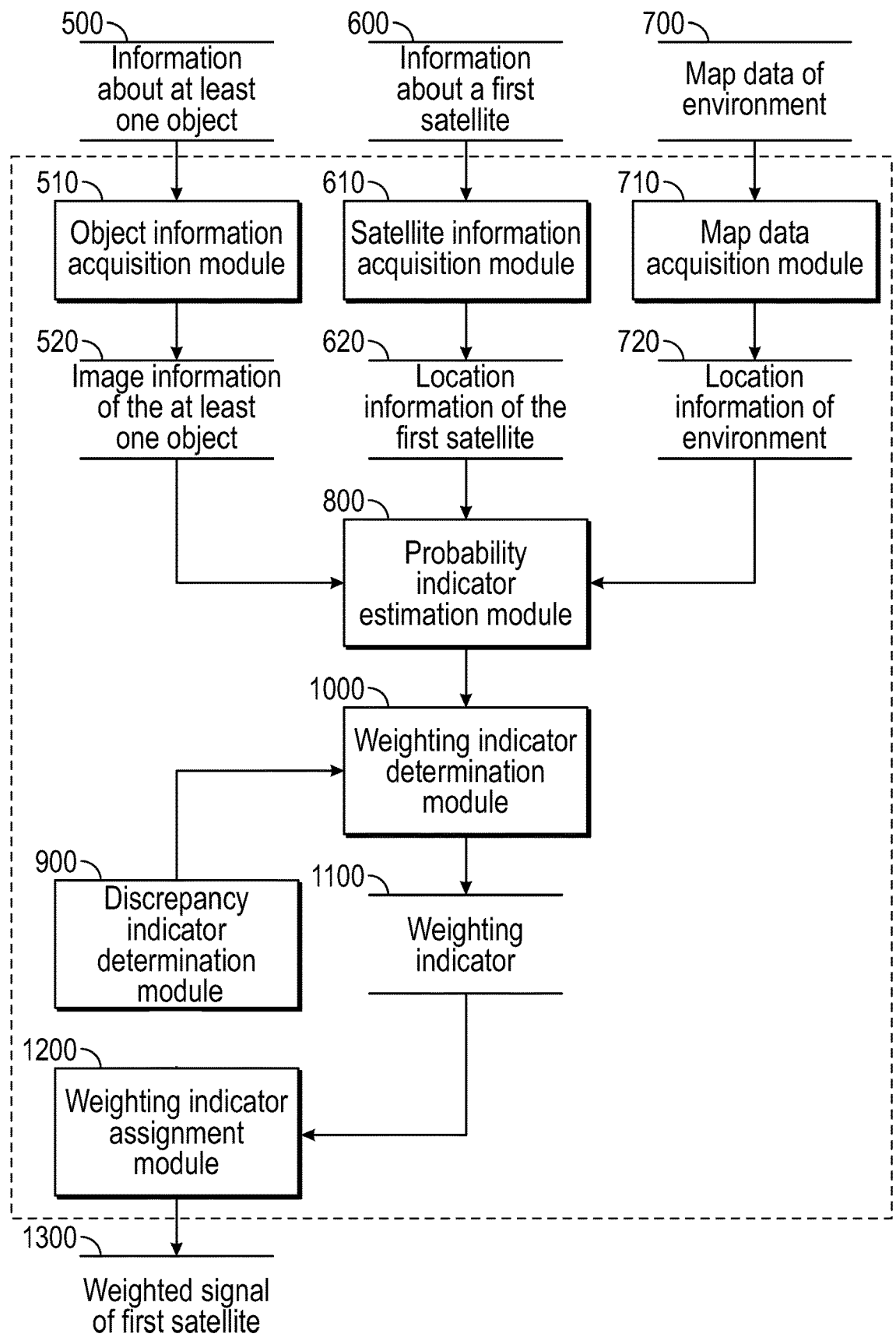
FIG. 7 illustrates a schematic diagram of a software architecture of the system of FIG. 2.

FIG. 7 illustrates a schematic diagram of a software architecture of the system 60 shown in FIG. 2 as it is executed by the processor 44 of the vehicle 10. In particular, the processor 44 includes different processing modules as will be described in the following.

In an exemplary embodiment, an information 500 about at least one object in an environment is acquired by an object information acquisition module 510 which provides the object information 500 about at least one object as image information 520 of the at least one object to a probability indicator estimation module 800.

In an exemplary embodiment, an information 600 about the first satellite is acquired by a satellite information acquisition module 610. The satellite information acquisition module 610 processes the information 600 about the first satellite to obtain location information 620 of the first satellite. The location information 620 of the first satellite is also provided to the probability indicator estimation module 800.

In an exemplary embodiment, additional map data 700 of the environment may optionally be acquired by the map data acquisition module 710 in order to provide location information 720 of the environment. The location information 720 of the environment may then also be provided to the probability indicator estimation module 800.

In an exemplary embodiment, the probability indicator estimation module 800 estimates a probability indicator for a non-line of sight signal transmission between a current satellite location of the first satellite and a current location of the vehicle, wherein the probability indicator is estimated using the information about the first satellite, i.e., the location information of the first satellite, and the information about the at least one object, i.e., the image information about the at least one object. It is noted that the steps 152, 153, 155, 157 and 158 described with reference to FIG. 4 are executed by the probability indicator estimation module 800 in order to estimate the probability indicator.

In an exemplary embodiment, a discrepancy indicator determination module 900 determines a discrepancy indicator based on a movement information of the vehicle and a movement information of the first satellite, wherein discrepancy indicator is representative for an inaccuracy in signal transmission between the first satellite and the vehicle. It is noted that the steps 201 to 203 described with reference to FIG. 5 are executed by the discrepancy indicator determination module 900 in order to estimate the discrepancy indicator.

In an exemplary embodiment, the weighting indicator determination module 1000 determines a weighting indicator 1100 using the estimated probability indicator and the determined discrepancy indicator from modules 800 and 900.

In an exemplary embodiment, the weighting indicator assignment module 1200 assigns the determined weighting indicator 1100 from module 1000 to a satellite signal transmitted from the first satellite in order to provide a weighted signal 1300 for navigating the vehicle.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A computer implemented method for navigating a mobile platform in an environment, comprising:

obtaining, by a processor, information about at least one object in the environment based on received data from the environment;

obtaining, by the processor, information about a first satellite;

estimating, by the processor, a probability indicator of a non-line of sight signal transmission between a current satellite location of the first satellite and a current location of the mobile platform, wherein the probability indicator is estimated using the information about the first satellite and the information about the at least one object;

determining, by the processor, a discrepancy indicator using a movement information of the mobile platform and a movement information of the first satellite, wherein discrepancy indicator is representative for an inaccuracy in signal transmission between the first satellite and the mobile platform;

determining, by the processor, a weighting indicator using the estimated probability indicator and the determined discrepancy indicator;

assigning, by the processor, the determined weighting indicator to a satellite signal transmitted from the first satellite in order to provide a first weighted signal; and controlling the mobile platform based on the first weighted signal, wherein obtaining information about the first satellite includes processing information about a determined location of the first satellite;

wherein the method further comprises:

determining, by the processor, a plurality of sample locations of the mobile platform in the environment, wherein the probability indicator is estimated using the determined location of the first satellite and the plurality of sample locations of the mobile platform, wherein estimating the probability indicator includes:

obtaining, by a camera, an image of the environment of the mobile platform, wherein the image includes the at least one object;

determining, by the processor, a plurality of sample locations of the first satellite using the sample locations of the mobile platform in the environment and a characteristic of the camera;

determining, by the processor, a plurality of points in the image that correspond to the plurality of sample locations of the first satellite by projecting the plurality of point into the image; and estimating, by the processor, the probability indicator based on a relative position of the plurality of points in the image with respect to the at least one object within the image.

2. The method of claim 1, wherein the at least one object in the environment is at least one of a dynamic object moving within the environment and a static object fixed with respect to the environment.

3. The method of claim 1, comprising:

obtaining the received data from the environment based on image data from an onboard camera of the mobile platform.

4. The method of claim 3, wherein the probability indicator is estimated using the image data of the environment, wherein the image data includes the information about the at least one object in the environment.

5. The method of claim 1, comprising:

obtaining, by the processor, the information about the at least one object in the environment further based on stored map data representative of the environment.

6. The method of claim 1, comprising:

identifying, by the processor, a first region within the image that represents the at least one object and a second region within the image that represents a sky; and estimating the probability indicator by determining a subset of sample locations of the first satellite that overlap with the second region within the image.

7. The method of claim 6, wherein the probability indicator is estimated by providing a ratio between the subset of sample locations of the first satellite that overlap with the second region and the plurality of sample locations of the first satellite.

8. The method of claim 1, wherein the probability indicator is estimated further using at least one of lidar information and radar information.

9. The method of claim 1, wherein the non-line of sight signal transmission between the current satellite location of the first satellite and the current location of the mobile platform occurs as a result of a blockage of a direct signal transmission between the first satellite and the mobile platform.

10. The method of claim 1, comprising:

using, by the processor, the weighted satellite signal for determining the current location of the mobile platform.

11. The method of claim 1, comprising:

combining, by the processor, the weighted satellite signal with a further satellite signal from a global navigation satellite system for determining the current location of the mobile platform.

12. The method of claim 1, comprising:

wherein the weighting indicator is determined as a weighting factor, and wherein the weighting factor is determined, by the processor, as a function of the probability indicator.

13. The method of claim 1, comprising:

determining the discrepancy indicator based on a measurement of a Doppler shift between the first satellite and the mobile platform.

14. The method of claim 1, comprising:

determining the discrepancy indicator based on a measurement of a pseudo-range between the first satellite and the mobile platform.

15. The method of claim 1, comprising:

obtaining, by the processor, information about a second satellite;

estimating, by the processor, a second probability indicator for a non-line of sight signal transmission between a current satellite location of the second satellite and a current location of the mobile platform, wherein the second probability indicator is estimated using the information about the second satellite and the information about the at least one object;

determining, by the processor, a second discrepancy indicator using a movement information of the mobile platform and a movement information of the second satellite, wherein second discrepancy indicator is representative for an inaccuracy in signal transmission between the second satellite and the mobile platform;

determining, by the processor, a second weighting indicator using the estimated second probability indicator and the determined second discrepancy indicator; and assigning, by the processor, the determined second weighting indicator to a satellite signal transmitted from the second satellite in order to provide a second weighted signal for navigating the mobile platform.

16. A vehicle, comprising:

a sensor configured to generate camera data; and a processor configured to:

obtain information about at least one object in the environment based on received camera data from the environment;

obtain information about a first satellite;

estimate a probability indicator of a non-line of sight signal transmission between a current satellite location of the first satellite and a current location of the vehicle, wherein the probability indicator is estimated using the information about the first satellite and the information about the at least one object;

determine a discrepancy indicator using a movement information of the vehicle and a movement information of the first satellite, wherein discrepancy indicator is representative for an inaccuracy in signal transmission between the first satellite and the vehicle;

determine a weighting indicator using the estimated probability indicator and the determined discrepancy indicator; and assign the determined weighting indicator to a satellite signal transmitted from the first satellite in order to provide a weighted signal for navigating the vehicle; and control the mobile platform based on the first weighted signal, wherein the processor is configured to obtain information about the first satellite by processing information about a determined location of the first satellite;

wherein the processor is further configured to:

determine a plurality of sample locations of the mobile platform in the environment, wherein the probability indicator is estimated using the determined location of the first satellite and the plurality of sample locations of the mobile platform, wherein the processor is configured to estimate the probability indicator by:

obtaining, by a camera, an image of the environment of the mobile platform, wherein the image includes the at least one object;

determining, by the processor, a plurality of sample locations of the first satellite using the sample locations of the mobile platform in the environment and a characteristic of the camera;

determining, by the processor, a plurality of points in the image that correspond to the plurality of sample locations of the first satellite by projecting the plurality of point into the image; and estimating, by the processor, the probability indicator based on a relative position of the plurality of points in the image with respect to the at least one object within the image.

17. A system for navigating a vehicle in an environment, comprising:

a first satellite; and a vehicle, comprising:

a processor configured to:

obtain information about at least one object in the environment based on received data from the environment;

obtain information about the first satellite;

estimate a probability indicator of a non-line of sight signal transmission between a current satellite location of the first satellite and a current location of the vehicle, wherein the probability indicator is estimated using the information about the first satellite and the information about the at least one object;

determine a discrepancy indicator using a movement information of the vehicle and a movement information of the first satellite, wherein discrepancy indicator is representative for an inaccuracy in signal transmission between the first satellite and the vehicle;

determine a weighting indicator using the estimated probability indicator and the determined discrepancy indicator; and assign the determined weighting indicator to a satellite signal transmitted from the first satellite in order to provide a weighted signal for navigating the vehicle; and control the mobile platform based on the first weighted signal, wherein the processor is configured to obtain information about the first satellite by processing information about a determined location of the first satellite;

wherein the processor is further configured to:

determine a plurality of sample locations of the mobile platform in the environment, wherein the probability indicator is estimated using the determined location of the first satellite and the plurality of sample locations of the mobile platform, wherein the processor is configured to estimate the probability indicator by:

obtaining, by a camera, an image of the environment of the mobile platform, wherein the image includes the at least one object;

determining, by the processor, a plurality of sample locations of the first satellite using the sample locations of the mobile platform in the environment and a characteristic of the camera;

determining, by the processor, a plurality of points in the image that correspond to the plurality of sample locations of the first satellite by projecting the plurality of point into the image; and estimating, by the processor, the probability indicator based on a relative position of the plurality of points in the image with respect to the at least one object within the image.

18. The system of claim 17, comprising:

a plurality of satellites;

wherein the processor is configured to:

obtain information about the plurality of satellites;

estimate probability indicators, wherein each probability indicator is indicative of a non-line of sight signal transmission between a current satellite location of a respective one of the plurality of satellites and a current location of the vehicle, wherein the probability indicator is estimated using the information about the plurality of satellites and the information about the at least one object;

determine weighting indicators using the estimated probability indicators; and assign each determined weighting indicator to a respective satellite signal transmitted from a respective one of the plurality of satellites in order to provide multiple weighted signals for navigating the vehicle.

* * * * *